United States Patent
Hwang et al.

(10) Patent No.: US 12,521,658 B2
(45) Date of Patent: Jan. 13, 2026

(54) ULTRA-HYDROPHILIC FILTRATION FILTER FOR OIL-WATER SEPARATION AND METHOD FOR MANUFACTURING SAME

(71) Applicant: POSTECH Research and Business Development Foundation, Pohang-si (KR)

(72) Inventors: Woonbong Hwang, Seoul (KR); Handong Cho, Daejeon (KR); Seongmin Kim, Cheonan-si (KR)

(73) Assignee: POSTECH RESEARCH AND BUSINESS DEVELOPMENT FOUNDATION, Pohang-si (KR)

( * ) Notice: Subject to any disclaimer, the term of this patent is extended or adjusted under 35 U.S.C. 154(b) by 672 days.

(21) Appl. No.: 17/779,728

(22) PCT Filed: Nov. 26, 2020

(86) PCT No.: PCT/KR2020/016904
§ 371 (c)(1),
(2) Date: May 25, 2022

(87) PCT Pub. No.: WO2021/194042
PCT Pub. Date: Sep. 30, 2021

(65) Prior Publication Data
US 2023/0022778 A1    Jan. 26, 2023

(30) Foreign Application Priority Data
Mar. 23, 2020   (KR) .................. 10-2020-0035025

(51) Int. Cl.
*B01D 39/16*   (2006.01)
*B01D 17/02*   (2006.01)
(Continued)

(52) U.S. Cl.
CPC ........... *B01D 39/163* (2013.01); *B01D 17/02* (2013.01); *C08J 3/24* (2013.01); *D06M 15/285* (2013.01);
(Continued)

(58) Field of Classification Search
CPC .............. B01D 39/163; B01D 17/02; B01D 2239/0421; B01D 2239/0492;
(Continued)

(56) References Cited

U.S. PATENT DOCUMENTS

| | | | |
|---|---|---|---|
| 5,518,610 A | 5/1996 | Pierpoline | |
| 5,753,014 A | 5/1998 | Van Rijn | |

(Continued)

FOREIGN PATENT DOCUMENTS

| | | |
|---|---|---|
| CN | 1467242 | 1/2004 |
| CN | 102029079 | 4/2011 |

(Continued)

OTHER PUBLICATIONS

SIPO, Office Action of CN 202080091825.2 dated Nov. 21, 2023.
(Continued)

*Primary Examiner* — Thuan D Dang
(74) *Attorney, Agent, or Firm* — LEX IP MEISTER, PLLC

(57) ABSTRACT

A method for ultra-hydrophilic surface treatment of a polymer fiber substrate according to the present invention comprises the steps of: forming a thermosetting coating layer on the surface of a polymer substrate; forming a carboxylate group (—COO—) on the surface of the thermosetting coating layer; forming an amide bond (—CONH—) between the
(Continued)

thermosetting coating layer and hydrogel monomers; and forming a hydrophilic polymer layer by crosslinking the hydrogel monomers.

6 Claims, 10 Drawing Sheets

(51) Int. Cl.
    *C08J 3/24*     (2006.01)
    *D06M 15/285*     (2006.01)
    *D06M 15/59*     (2006.01)
    *D06M 101/20*     (2006.01)
    *D06M 101/22*     (2006.01)

(52) U.S. Cl.
    CPC ..... *D06M 15/59* (2013.01); *B01D 2239/0421* (2013.01); *B01D 2239/0492* (2013.01); *B01D 2239/10* (2013.01); *C08J 2379/08* (2013.01); *D06M 2101/20* (2013.01); *D06M 2101/22* (2013.01); *D06M 2400/01* (2013.01)

(58) Field of Classification Search
    CPC ........ B01D 2239/10; B01D 2239/0478; B01D 17/08; B01D 39/1623; B01D 2239/1233; C08J 3/24; C08J 2379/08; D06M 15/285; D06M 15/59; D06M 2101/20; D06M 2101/22; D06M 2400/01; D06M 2400/02
    See application file for complete search history.

(56) References Cited

U.S. PATENT DOCUMENTS

| | | | |
|---|---|---|---|
| 6,039,872 | A | 3/2000 | Wu et al. |
| 8,216,561 | B2 | 7/2012 | Petersen |
| 9,650,262 | B2 | 5/2017 | Hwang et al. |
| 9,650,518 | B2 | 5/2017 | Meuler et al. |
| 9,868,911 | B2 | 1/2018 | Reams et al. |
| 9,884,775 | B2 | 2/2018 | Hwang et al. |
| 9,919,250 | B2 | 3/2018 | Liu |
| 10,220,351 | B2 | 3/2019 | Tuteja et al. |
| 2011/0253621 | A1 | 10/2011 | Kim et al. |
| 2011/0303620 | A1 | 12/2011 | Gao |
| 2012/0000853 | A1 | 1/2012 | Tuteja et al. |
| 2019/0224629 | A1 | 7/2019 | Yang et al. |

FOREIGN PATENT DOCUMENTS

| | | | |
|---|---|---|---|
| CN | 108503791 | | 9/2018 |
| JP | S59160504 | | 9/1984 |
| KR | 20110115856 | | 10/2011 |
| KR | 20140074028 | | 6/2014 |
| KR | 20160022619 | | 3/2016 |
| KR | 20170081439 | | 7/2017 |
| TW | 201440883 | | 11/2014 |
| WO | WO-2016210153 | A1 * | 12/2016 ........... B01D 39/163 |

OTHER PUBLICATIONS

Kipo, PCT Search Report & Written Opinion of PCT/KR2020/016904 dated Mar. 2, 2021.
Seongmin Kim et al., "Robust superhydrophilic depth filter and oil/water separation device with pressure control system for continuous oily water treatment on a large scale", Separation and Purification Technology 256 (2021) 117779, https://doi.org/10.1016/j.seppur.2020.117779.
Zhongxin Xue et al., "A Novel Superhydrophilic and Underwater Superoleophobic Hydrogel-Coated Mesh for Oil/Water Separation", Adv. Mater. 2011, 23, 4270-4273, DOI: 10.1002/adma.201102616.
Xiaoyang Wang et al., "Facile preparation of loess-coated membranes for multifunctional surfactant-stabilized oil-in-water emulsion separation", Green Chem., 2019, 21, 3190-3199, DOI: 10.1039/c9gc00747d.
Arun K. Kota et al., "Hygro-responsive membranes for effective oil-water separation", Nature Communications, 3, 1025, Aug. 28, 2012, DOI: 10.1038/ncomms2027.
Cailong Zhou et al., "Superhydrophilic and underwater superoleophobic titania nanowires surface for oil repellency and oil/water separation", Chemical Engineering Journal 301 (2016) 249-256, May 7, 2016, http://dx.doi.org/10.1016/j.cej.2016.05.026.
Seong Kyung Hong et al., "An underwater superoleophobic nanofibrous cellulosic membrane for oil/water separation with high separation flux and high chemical stability", Nanoscale, 2018, 10, 3037-3045, DOI: 10.1039/c7nr08199e.
Shoujian Gao et al., "A Robust Polyionized Hydrogel with an Unprecedented Underwater Anti-Crude-Oil-Adhesion Property", Adv. Mater. 2016, 28, 5307-5314, DOI: 10.1002/adma.201600417.
Mngying Yin et al., "Microphone-like Cu-CAT-1 hierarchical structures with ultra-low oil adhesion for highly efficient oil/ water separation", Separation and Purification Technology 241 (2020) 116688, https://doi.org/10.1016/j.seppur.2020.116688.
J.A. Prince et al., "Ultra-wetting graphene-based PES ultrafiltration membrane e A novel approach for successful oil- water separation", Water Research 103 (2016) 311-318, Jul. 19, 2016, http://dx.doi.org/10.1016/j.watres.2016.07.042.
Shenxiang Zhang et al., "Cupric Phosphate Nanosheets-Wrapped Inorganic Membranes with Superhydrophilic and Outstanding Anticrude Oil-Fouling Property for Oil/Water Separation", ACS Nano 2018, 12, 795-803, Jan. 3, 2018, DOI: 10.1021/acsnano.7b08121.
Gary J. Dunderdale et al., "Continuous, High-Speed, and Efficient Oil/Water Separation using Meshes with Antagonistic Wetting Properties", ACS Appl. Mater. Interfaces 2015, 7, 18915-18919, Aug. 14, 2015, DOI: 10.1021/acsami.5b06207.
Jianlong Ge et al., "Biomimetic and Superwettable Nanofibrous Skins for Highly Efficient Separation of Oil-in-Water Emulsions", Adv. Funct. Mater. 2018, 28, 1705051, DOI: 10.1002/adfm.201705051.

* cited by examiner

[FIG. 1]
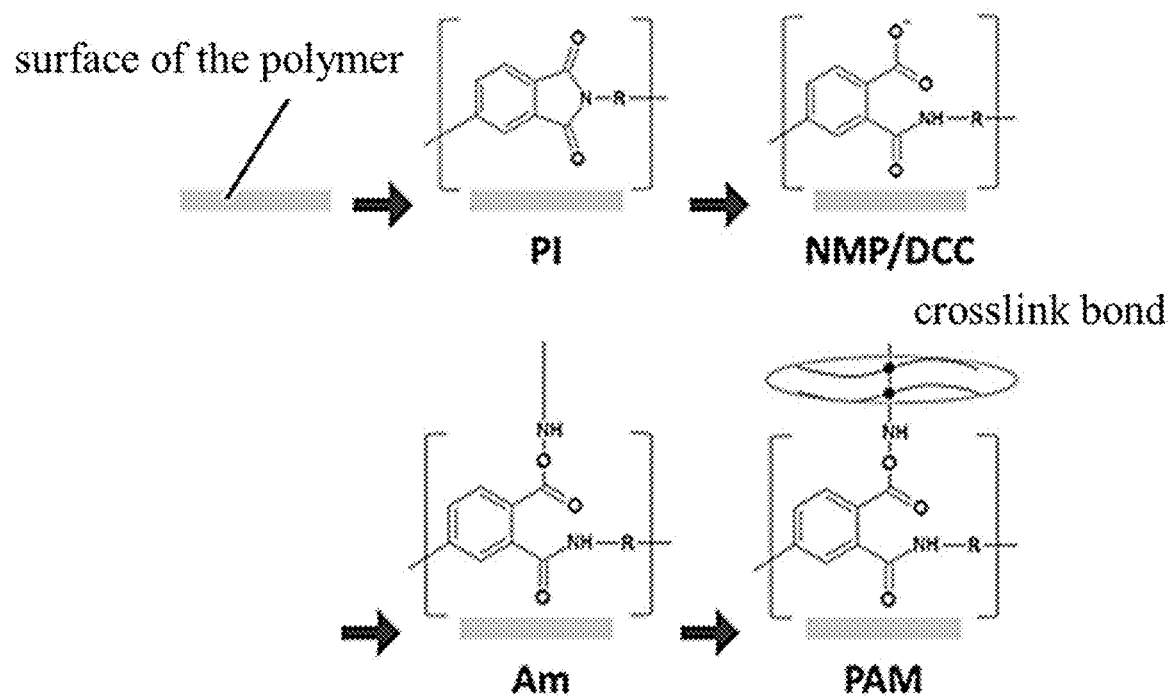

[FIG. 2]
Comparative Example 1
polymer fiber
(without surface treatment)
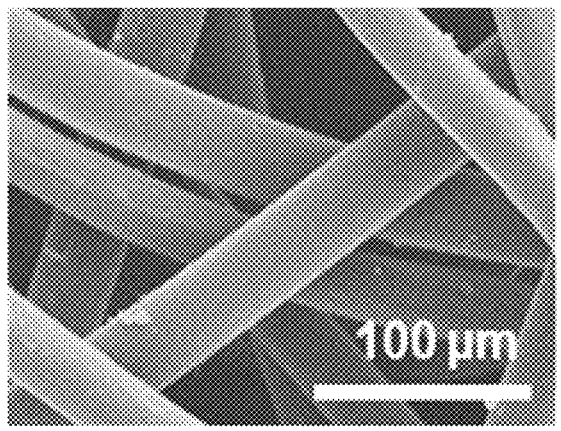
Example 1
polymer fiber
(surface treatment)
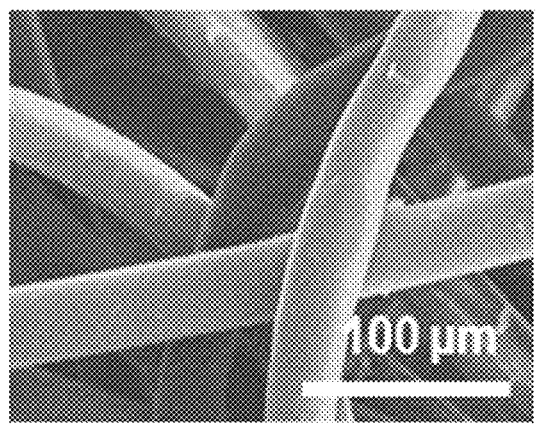

[FIG. 3]
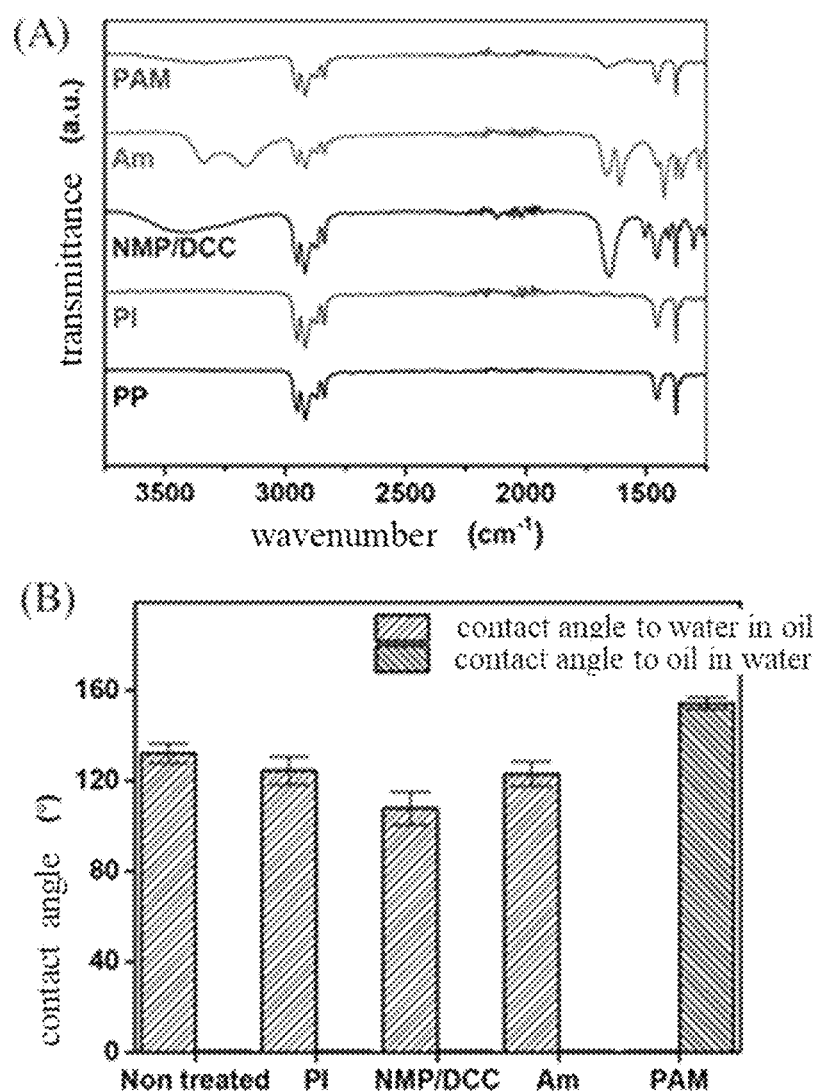

[FIG. 4]
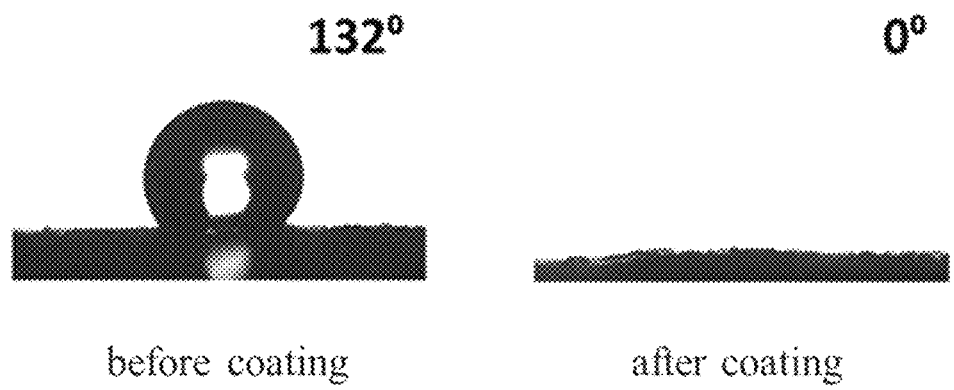
before coating          after coating
[FIG. 5]
before adhering the tape          after adhering the tape
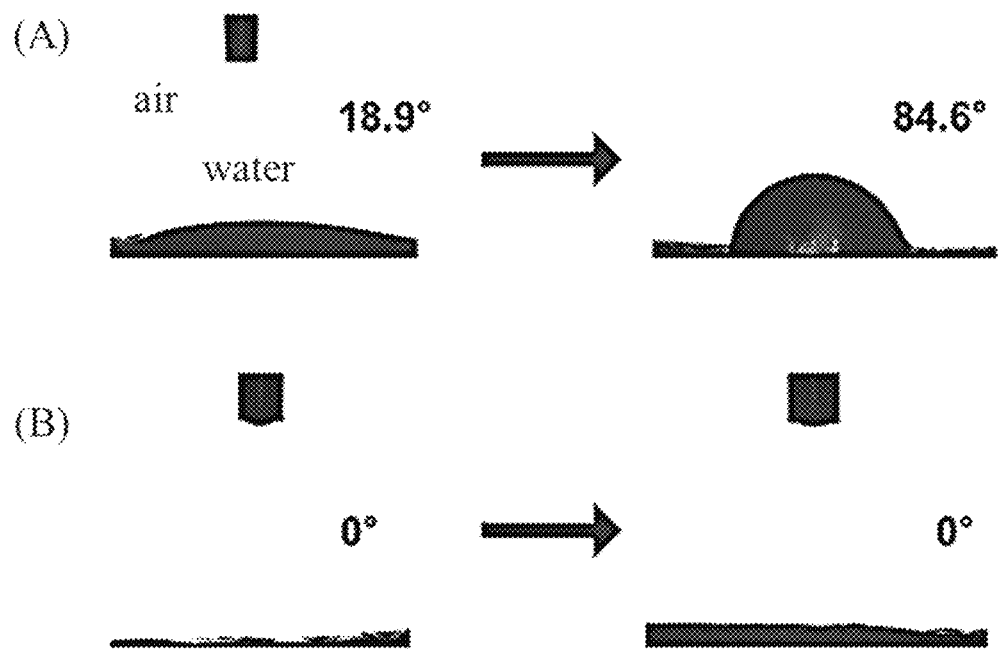

[FIG. 6]
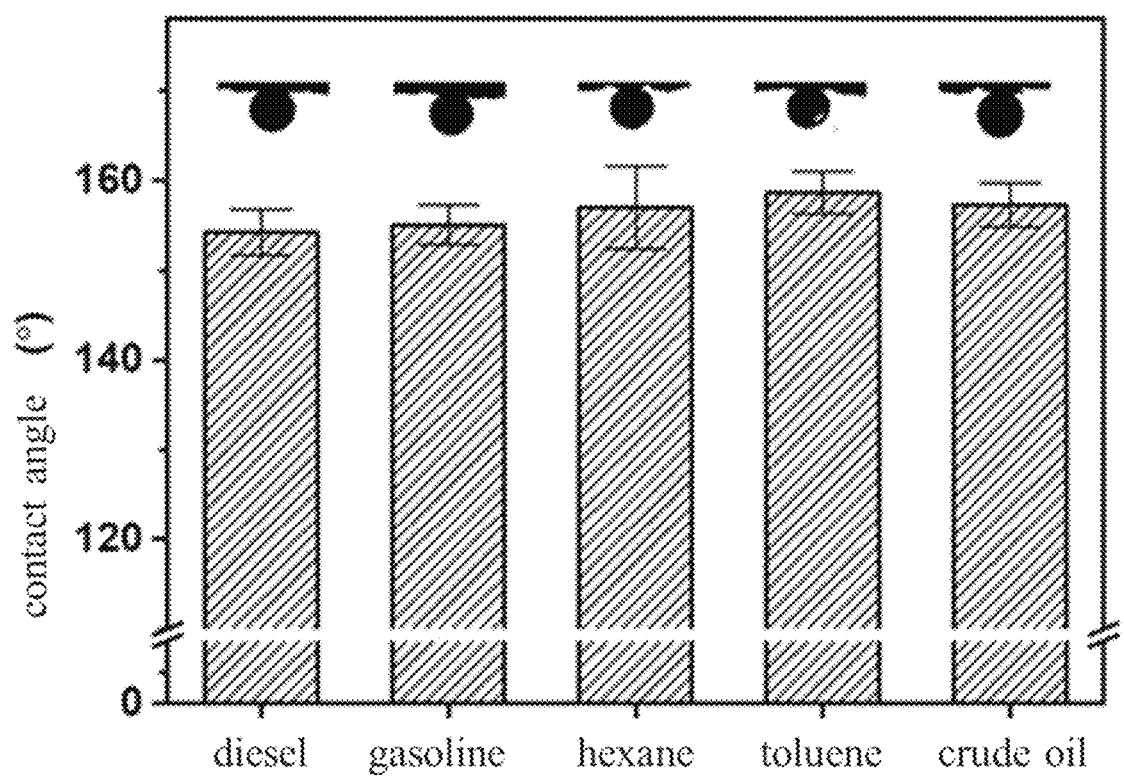

[FIG. 7]
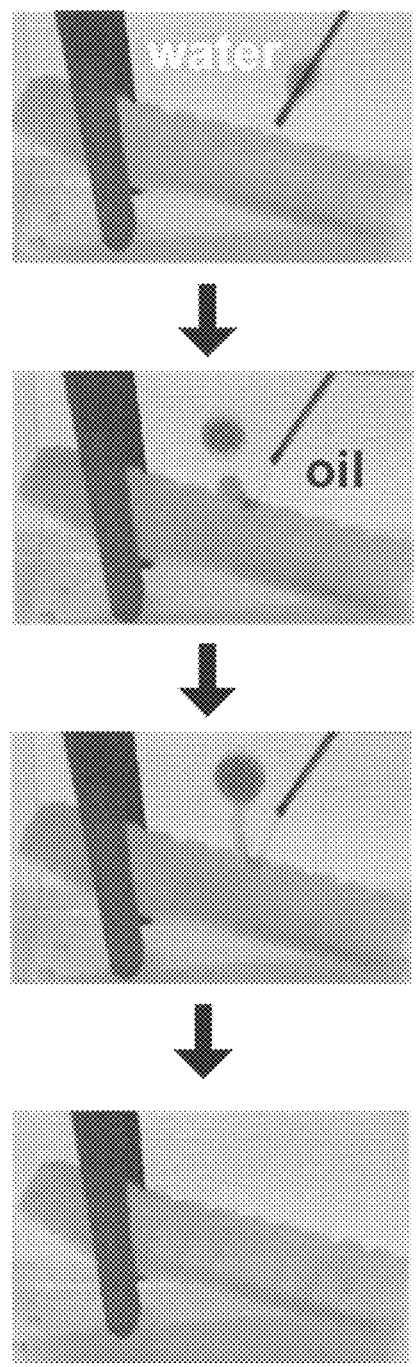

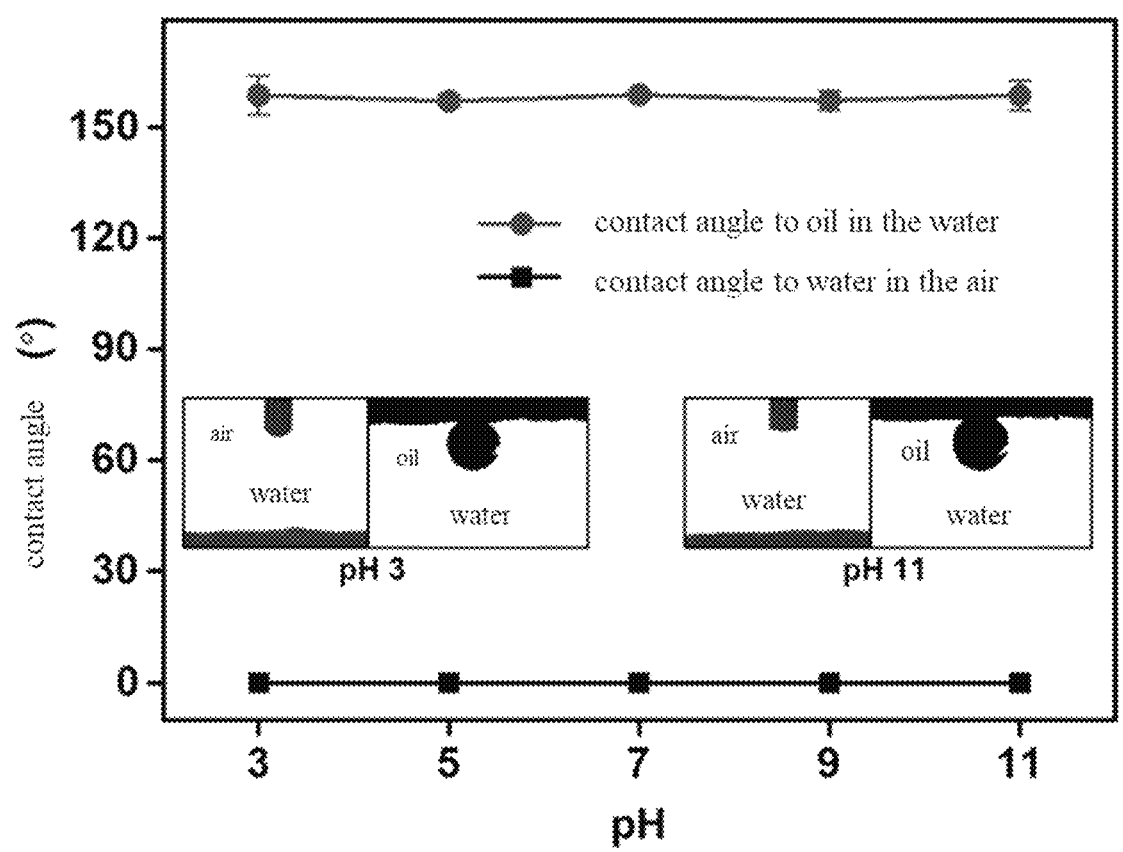
[FIG. 8]

[FIG. 9]
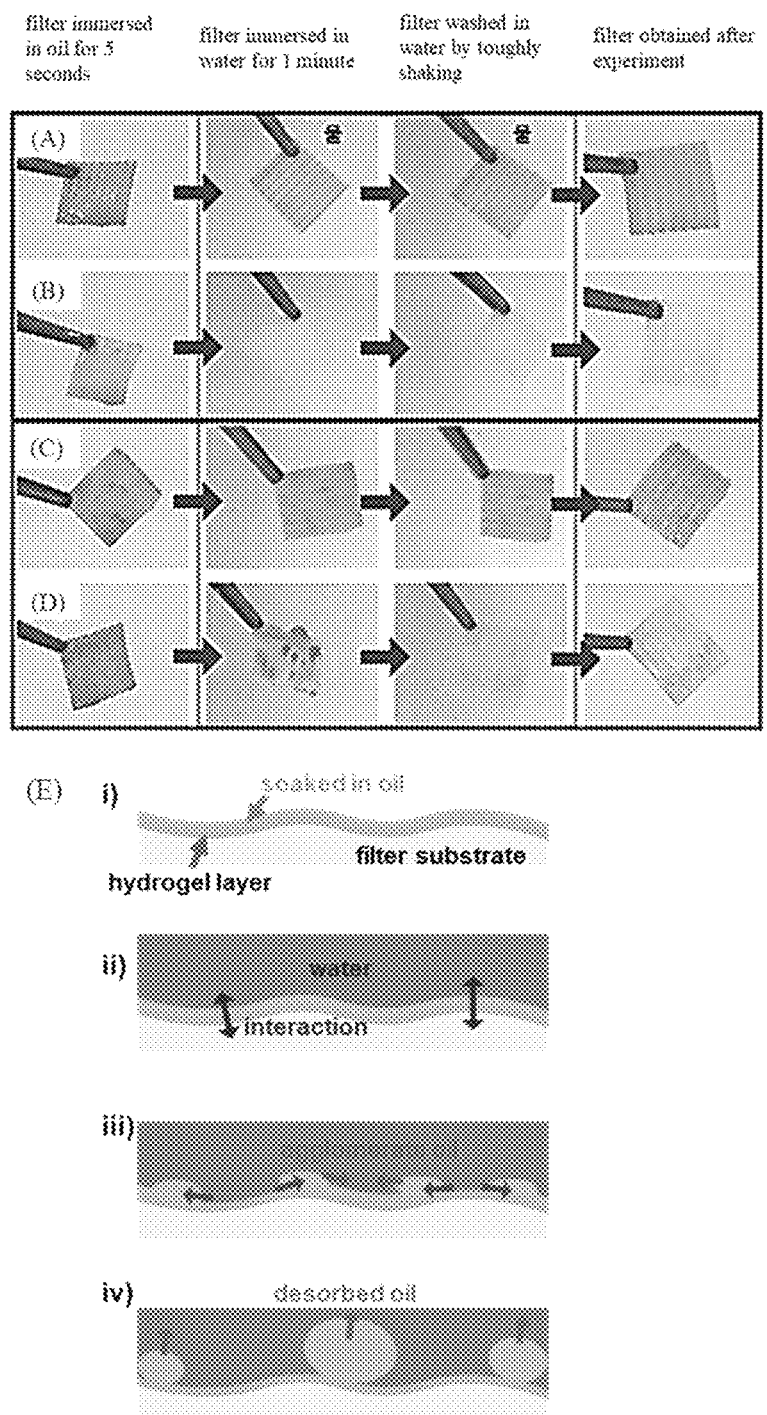

[FIG. 10]
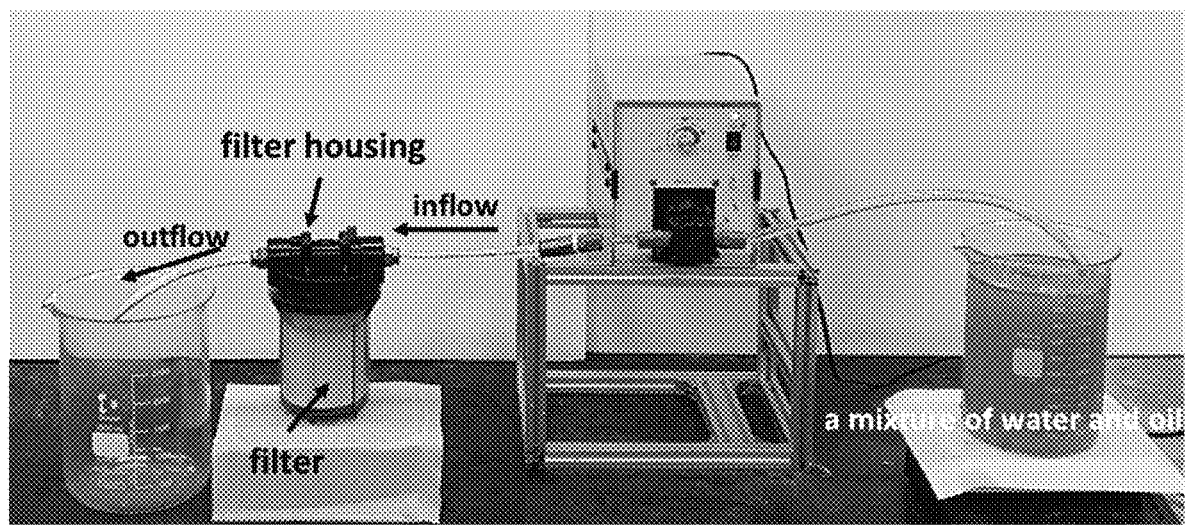

[FIG. 11]
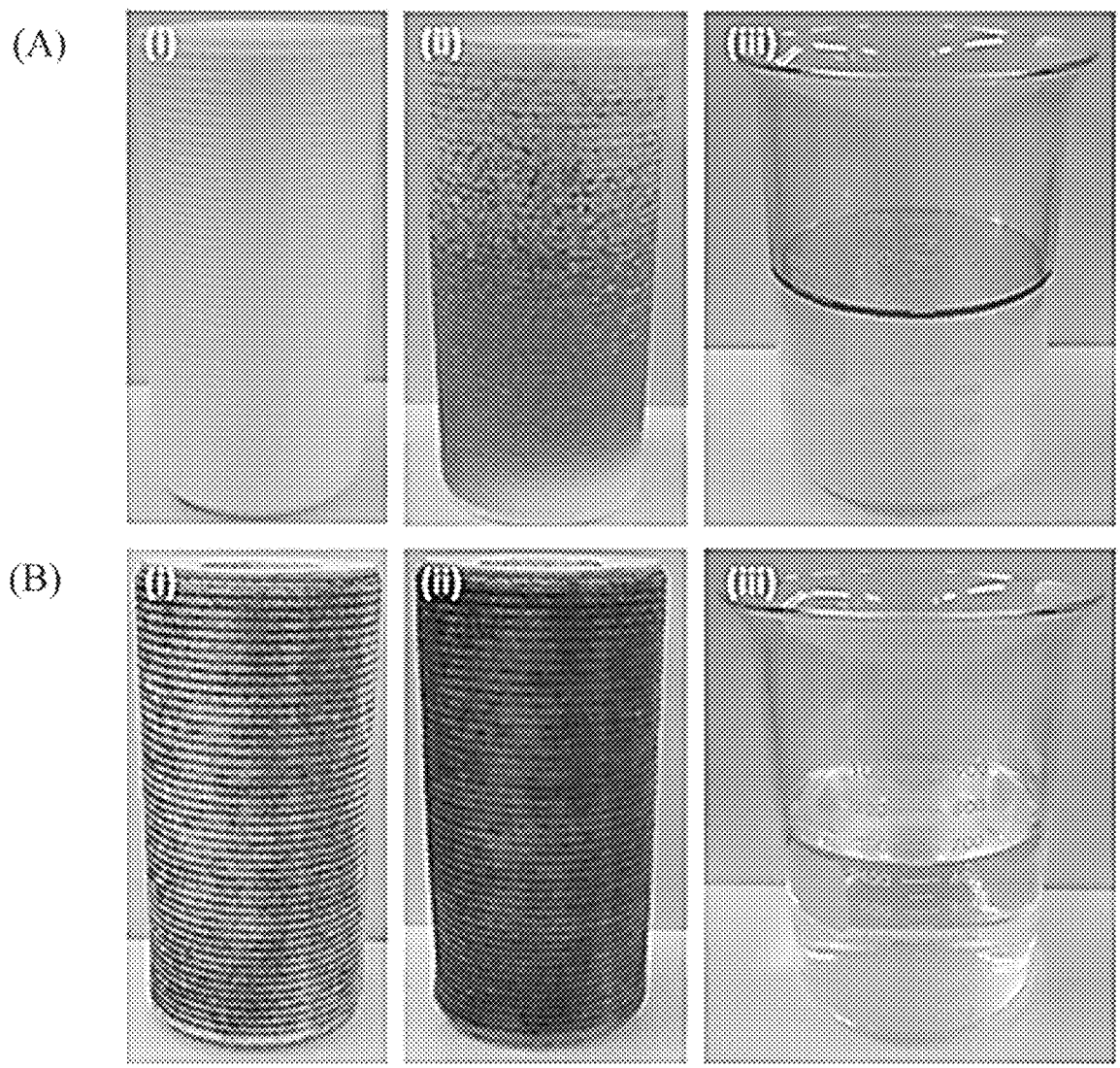

ULTRA-HYDROPHILIC FILTRATION FILTER FOR OIL-WATER SEPARATION AND METHOD FOR MANUFACTURING SAME

TECHNICAL FIELD

The present invention relates to a filter having super-hydrophilic surface for oil-water separation and method of manufacturing the same, and more particularly, to a filter having super-hydrophilic surface for oil-water separation having a super-hydrophilically modified surface and method of manufacturing the same, and a method for oil-water separation using the filter.

BACKGROUND ART

Generally, oil-water separation facility and non-point pollution reduction facility (initial rainwater treatment facility) for separating an oil contained in water or a moisture in oil from oil components and non-point pollutants flowing into a wastewater treatment plant or a rainwater pipeline utilize a removal method by the difference in specific gravity between oil and water, and a removal method by Stoke's law based on a specific buoyancy (gravity) difference of an oil-water mixture and the flow of the mixture due to the buoyancy force.

The removal method by the difference in specific gravity between oil and water is to flow contaminated water containing oil components into a treatment tank and allow them to stand. Therefore, since oil is lighter than water, it is removed by floating and condensing on the water and separating into two liquid phases of oil and water. However, in such a method, if the size of the oil droplet is 1 mm or more, it is relatively easily separated, but oil droplets with a diameter of 1 to 1.5 μm, which are finely broken through the flow of fluid, require a long time to separate from floating condensation, and the treatment efficiency is lowered.

Further, the removal method by Stoke's law based on a specific buoyancy (gravity) difference of an oil-water mixture and the flow of the mixture due to the buoyancy force is a COALESCING PLATE PACK type that expands the effective contact area by installing several horizontal plates or parallel inclined plates in the treatment tank, and is to allow contaminated water containing oil components to pass through a bonding body in which a polypropylene corrugated plate or an egg plate-shaped plate material is arranged in multiple stages. However, when this method is used for a long period of time, a viscous sludge bonded with oil components and suspended matter is deposited between the bonded multi-stage corrugated plates or egg plates, which hinders the passage of fluid.

A solid has an inherent surface energy, and when it comes into contact with any liquid, the surface energy of the solid and the liquid exhibits the property that the liquid to wet or not wet the surface of the solid. When the contact angle between the surface and water is 90° or less, the surface is called a hydrophilic surface, and when the contact angle with water is 100 or less and the surface is rapidly wetted by water, the surface is called a super-hydrophilic surface. Such a super-hydrophilic surface can be realized by coating with a material having a hydrophilic functional group or by coating with hydrophilic nanoparticles or the like.

Materials having a hydrophilic functional group include dopamine and the like. However, these materials are highly reactive with other chemical functional groups and thus can easily lose their hydrophilicity when the hydrophilic functional groups disappear. Further, a hydrophilic surface body can be made using chemically stable nanoparticles such as titanium dioxide ($TiO_2$) and silicon dioxide ($SiO_2$), but there is a disadvantage in that the bonding force with a substrate is weak and thus the surface body can easily lose its hydrophilicity.

On the other hand, in order to overcome the existing oil-water separation limit, a filter filtration method using the difference in wettability between water and oil was introduced. The filter for oil-water separation is divided into a super-hydrophobic filter having a contact angle with water of 1500 or more and not getting wet with water, and a super-hydrophilic filter having a contact angle with water of 10° or less and completely getting wet with water. In the case of the super-hydrophobic filter, water in the oil-water mixture does not pass through, and only oil passes through to perform oil-water separation. However, when the super-hydrophobic filter is used, the surface of the filter is contaminated in the process of oil passing through the filter, which may lead to deterioration of oil-water separation performance.

DETAILED DESCRIPTION OF THE INVENTION

Technical Problem

On aspect of the present invention provides a filtration filter for oil-water separation having a super-hydrophilic surface of a hydrophilic hydrogel layer strongly bonded to the surface of a polymer fiber by applying a method of super-hydrophilic surface treatment to filtration filters or polymer fibers for filtration filters.

Another aspect of the present invention provides a method of super-hydrophilic surface treatment for a polymer fiber substrate, modifying surface of a filtration filter having a super-hydrophilic surface, a polymer fiber to be used for manufacturing the filtration filter, or a polymer fiber included in a filtration filter, to be super-hydrophilic, through multi-wet coating methods.

Another aspect of the present invention provides a method of filtration for oil-water separation using the hydrophilically-modified super-hydrophilic filtration filter for oil-water separation.

However, the problems to be solved by the embodiments of the present invention are not limited to the above-mentioned problems, and can be variously expanded within the scope of the technical idea included in the present invention.

Technical Solution

Hereinafter, the present invention will be described in more detail.

An embodiment of the present invention relates to a filter medium comprising a thermosetting coating layer and a hydrogel layer formed on the surface of a polymer fiber to be used for manufacturing a filtration filter or a polymer fiber included in the filtration filter, or a filtration filter for oil-water separation comprising the filter medium, for example, a depth filtration filter, wherein the thermosetting coating layer and the hydrogel layer are bonded by an acrylamide crosslink bond.

The surface-modified polymer fiber, or a filter medium or a filtration filter comprising the surface-modified polymer fiber may have a super-hydrophilicity with a contact angle to water in air being 10° or less, and/or an oleophobicity with a contact angle to oil in water being 150° to 180°, more preferably 150° to 170°.

The filter for oil-water separation according to the present invention is a super-hydrophilic filter that completely gets wet with water to have a contact angle with water being 10° or less, and the filter gets completely wet with water so as to form a water film, resulting in very low adhesive force with oil. Therefore, the filter for oil-water separation can allow water in the oil-water mixture to pass through and cut off the oil by a water film to separate oil and water. The super-hydrophilic filter is hardly contaminated by oil, and thus can be usefully used as a filter for oil-water separation.

A method of manufacturing a super-hydrophilic filter for oil-water separation according to one embodiment of the present invention can be performed by a process comprising (1) a step of forming a thermosetting coating layer onto a polymer fiber to be used for manufacturing a filtration filter, or a filter medium or a filtration filter containing a polymer fiber, (2) a step of bonding hydrogel-forming monomers to a surface functional group of the thermosetting coating layer; and (3) a step of forming a hydrophilic polymer layer by crosslinking the hydrogel-forming monomers. Specifically, the method of manufacturing a super-hydrophilic filter for oil-water separation according to one embodiment of the present invention may include performing a super-hydrophilic surface treatment on the raw polymer fiber to be used for manufacturing a filter medium or a filtration filter and then manufacturing the filter medium or the filtration filter, or alternatively include performing a super-hydrophilic surface treatment on a filter medium or a filtration filter containing the polymer fiber.

Specifically, the method of manufacturing a super-hydrophilic filter for oil-water separation according to one embodiment of the present invention includes a process of hydrophilic surface treatment for polymer fiber to be used for manufacturing a filter comprising (1) a step of forming a thermosetting coating layer onto a polymer fiber to be used for manufacturing a filtration filter, (2) a step of bonding hydrogel-forming monomers to a surface functional group of the thermosetting coating layer; and (3) a step of forming a hydrophilic polymer layer by crosslinking the hydrogel-forming monomers, and further includes (4) a step of manufacturing a filter medium or a filter using the hydrophilic surface-treated polymer fiber. The (4) step of manufacturing a filter using the hydrophilic surface-treated polymer fiber can be performed according to the characteristics of the filter, and for example, a depth filtration filter can be manufactured by laminating polymer fibers in a plurality of layers to form a cylindrically formed structure.

A method of manufacturing a super-hydrophilic filter for oil-water separation according to another embodiment of the present invention can be performed by a process comprising (1) a step of forming a thermosetting coating layer on a filter medium or a filtration filter containing the polymer fiber, (2) a step of bonding hydrogel-forming monomers to a surface functional group of the thermosetting coating layer, and (3) a step of forming a hydrophilic polymer layer by crosslinking the hydrogel-forming monomers.

In one example of the filtration filter according to the present invention, the depth filtration filter may have a structure formed in a cylindrical shape in which polymer fibers are laminated in multiple layers. Such a cylindrical depth filter performs a filtration function with a mechanism that allows particles to be collected inside the filter while passing through a non-linear movement path in a media layer having a thickness of several mm to several tens of mm, and the filter has a large surface area per unit volume, and thus, is very effective in removing pollutants. For example, the polymer filter according to the present invention is composed of a polymer fiber having a diameter of about 10 to 50 µm, the polymer fibers are randomly crossed to form pores, and the pores have a diameter of 100 µm or less, for example a diameter of 10 µm to 100 µm. The fluid passes through the pores of the filter, and pollutants that do not pass through the pores are accumulated outside the filter.

The (2) step of bonding the hydrogel-forming monomers can be performed by forming a carboxylate group (—COO—) on the surface of the thermosetting coating layer, and forming an amide bond (—CONH—) between the carboxylate group and the hydrogel monomers.

Hereinafter, each step will be described in detail.

A method of manufacturing a super-hydrophilic filter for oil-water separation according to an embodiment of the present invention includes a step of forming a thermosetting coating layer on a polymer fiber to be used for manufacturing a filtration filter, or a filter medium or a filtration filter comprising a polymer fiber.

Specifically, the step of forming a thermosetting coating layer on the surface of the polymer fiber according to the present invention is a step of forming a thermosetting coating layer on the surface of the polymer substrate filter using a thermosetting coating solution containing polyimide (PI) or polyamic acid (PAA).

Specifically, a polymer substrate filter is immersed in a thermosetting coating solution, the solution is coated onto the surface, and then the filter is taken out, cured and dried at 110 to 130° C. for a set period of time, so that the thermosetting coating layer can be made to be uniformly formed on the polymer fiber surface. The step may be performed by immersing the polymer fiber, or a filter medium or a filter composed of polymer fiber in a thermosetting coating solution, but in the case of a depth filtration filter having a multilayer structure, it is more preferable to perform under reduced pressure or vacuum conditions to form a coating layer.

The thermosetting coating solution can be used as a coating solution by diluting a resin containing polyimide or polyamic acid alone or a mixture of two materials in an organic solvent at a weight ratio set in a concentration range of 1 to 20 wt %. The organic solvent may be at least one solvent selected from the group consisting of NMP (N-methyl-2-pyrrolidone), DMAC (dimethylacetamide), and DMF (dimethylformamide).

The type of the polyimide is not particularly limited, and for example, it may be a thermosetting linear polyimide and an aromatic heterocyclo polyimide compound. Specifically, typical examples of commercially available polyimides include, but are not limited to, General Electric (trade name: Ultem) and DuPont (trade name: Kapton).

The method of super-hydrophilic surface treatment according to the present embodiment can be applied to a polymer substrate filter. The polymer-based, which is the material of the filter, can be applied to the surface of various polymers such as polypropylene (PP), polyethylene (PE), polyvinylidene fluoride (PVDF), and polytetrafluoroethylene (PTFE). The multi-wet coating process for the super-hydrophilic surface treatment can be applied to the polymer filter to manufacture a super-hydrophilic polymer filter. The super-hydrophilic polymer filter manufactured through the above method forms a water film, cut off contact with oil, and selectively transmits only water in the oil-water mixture, thereby performing oil-water separation.

The polymer fibers, specifically, polymers such as PP, PE, PVDF and PTFE, have physical durability, chemical resistance, and flexibility, and thus are utilized as filters for various purposes. However, these filters are composed of a methyl group, a fluoro group or the like with very low surface tension, and thus exhibit hydrophobicity. Therefore, in order to use the polymer filter as a filter for oil-water separation, it is necessary to modify the surface to be super-hydrophilic with almost no contamination by oil. Conventionally, due to the inert characteristic of the polymer filter surface, it was difficult to modify the surface to be super-hydrophilic, and it was difficult to secure a strong bond between the hydrophilic coating layer and the surface of the polymer substrate. However, these problems can be solved by the super-hydrophilic surface treatment method of the polymer substrate filter according to the present invention.

A method of manufacturing a super-hydrophilic filter for oil-water separation according to an embodiment of the present invention includes a step of bonding a hydrogel monomer to a thermosetting coating layer via an amide bond to the surface functional group of the thermosetting coating layer.

Specifically, the step of bonding a hydrogel monomer to a thermosetting coating layer includes a step of forming a carboxylate group on the surface of the thermosetting coating layer, and forming an amide bond between the carboxylate functional group and the hydrogel monomer. In order to firmly adhere the polyacrylamide (PAM) hydrogel layer to the polymer filter on which the thermosetting coating layer is formed, an amide bond is formed between the thermosetting coating layer and the hydrogel layer, and a carboxylate group is formed on the surface of the thermosetting coating layer. For example, the step of forming a carboxylate group (—COO—) on the surface of the thermosetting coating layer can be performed by a process of dissolving the thermosetting coating layer with polyamic acid to form a carboxyl group, followed by reacting with N,N-dicyclohexylcarbodiimide (DCC) and dehydrating to form a carboxylate group (—COO—).

Specifically, in order to induce a strong bond between the thermosetting coating layer and the hydrogel layer, the coated surface of the thermosetting polymer formed on the polymer-substrate filter can be immersed in a DCC solution at room temperature to form a carboxylate group. In the case of a depth filtration filter having a multilayer structure, the process of immersion for forming the carboxylate group is more preferably performed under reduced pressure or vacuum conditions. The DCC solution can be prepared by dissolving a DCC crystal powder in an organic solvent such as N-methyl-2-pyrrolidone (NMP) at a weight ratio set in a concentration range of 0.5 to 5 wt %. In this process, the thermosetting coating layer is dissolved by NMP to form a carboxyl group (—COOH), and this carboxyl group causes a deprotonation reaction by DCC to form a carboxylate group.

The step of forming an amide bond between the thermosetting coating layer and the hydrogel-forming monomer may include a process of reacting a hydrogel-forming monomer, for example, an acrylamide (Am) monomer with the carboxylate group to form an amide bond. The amide bond can be formed by reacting with a carboxylate group due to the strong nucleophilicity of the amine group (—NH$_2$). In the hydrogel-forming monomer, for example, acrylamide monomer, in which a strong bond with the surface of the thermosetting coating layer is induced by the amide bond, the hydrophilic amine group forms an amide bond, and thus the hydrophobic alkyl chain are exposed on the surface. In the filter coated with the hydrogel monomer, the amine group (hydrophilic) of the acrylamide monomer forms an amide bond, so that a hydrophobic alkyl group is exposed on the filter surface and thus does not exhibit hydrophilicity.

The reaction that forms an amide bond is represented by the following Reaction Scheme 1, and the amide bond can be formed by nucleophilic reaction of an amine group of the acrylamide with the carboxylate group.

[Reaction Scheme 1]

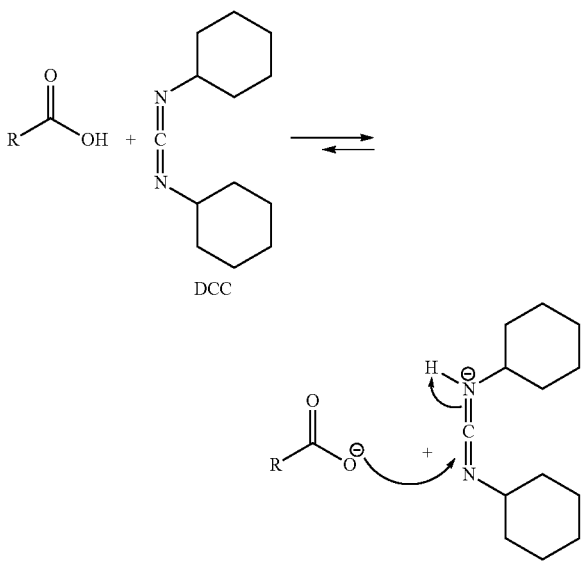

The coating solution containing the hydrogel-forming monomers, for example, acrylamide can be prepared by using an aqueous solution of ethanol containing ethanol at a set ratio, for example ethanol at a concentration of 0 to 30 wt %, as a solvent (0% means water containing no ethanol), and dissolving acrylamide powder at a set weight ratio, for example, 20 to 30 wt %. This may be performed by immersing in a solution treated with the acrylamide coating solution, but in the case of a depth filtration filter having a multilayer structure, this is more preferably performed under reduced pressure or vacuum conditions.

In a specific embodiment, the surface on which the carboxylate group is formed in the above step can be immersed in the acrylamide coating solution at 60 to 80° C. for 1 to 3 hours, to form an amide bond.

A method for manufacturing a super-hydrophilic filter for oil-water separation according to an embodiment of the present invention includes a step of forming a crosslinked hydrogel layer.

In an example of the monomers used in the preparation of the crosslinked hydrogel layer of the present invention, the acrylamide is linked to the thermosetting coating layer of the filter by an amide bond. Acrylamide, which is a hydrogel-forming monomer bonded to the coating layer, can be subjected to crosslinking polymerization using a crosslinking agent, a polymerization solvent and an oxidation catalyst to form a polyacrylamide crosslinked hydrogel layer. Polyacrylamide gel is a polymer obtained by chemically polymerizing monomer-type acrylamide with bisacrylamide, which has a web-like structure in three dimension and forms a crosslinked hydrogel layer.

The crosslinked hydrogel of the present invention is a crosslinking agent and may include monomers having two or more reactive groups as a copolymerization component. In such a case, the polymer of the present invention has resistance to a solvent (solvent resistance). A preferred example of monomers having two or more polymerizable groups as a crosslinking agent is bisacrylamide, and specifically, it includes N,N'-methylene bisacrylamide, N,N'-ethylene bisacrylamide, N,N'-propylene bisacrylamide, and the like. Among them, bisacrylamide is preferable from the viewpoint of increasing the polymerization rate, and N,N'-methylene bisacrylamide and N,N'-ethylene bisacrylamide are particularly preferred.

Specifically, the surface on which the amide bond is formed may be immersed in a crosslinking solution at 60 to 80° C. for 1 to 3 hours. The surface on which the amide bond is formed, may be immersed in a crosslinking solution, but in the case of a depth filtration filter having a multilayer structure, it is more preferable to perform under reduced pressure or vacuum conditions.

The crosslinking solution includes a crosslinking agent, a polymerization solvent and an oxidation catalyst. In this process, ammonium persulfate (APS) can form a radical to break the double bond of N,N-methylenebisacrylamide (BIS), thereby forming a radical in BIS. This BIS radical can bind to a chain of acrylamide (Am) to form a crosslink, so that a hydrogel layer can be formed.

In the step of forming the crosslinked hydrogel layer, a polymerization solvent can be used in the crosslinking polymerization reaction, and may be any type of organic or inorganic solvent. Examples of polymerization solvents usable in the present invention may be water, methanol, ethanol, propanol, 2-propanol, butanol, tert-butanol, tert-amyl alcohol, 3,7-dimethyl-3-octanol, tetrahydrolinalool, and other alcoholic solvents, or aqueous alcohol solutions.

An oxidation catalyst is used as a polymerization reaction catalyst for forming a crosslinked hydrogel layer, and for example, at least one persulfate catalyst selected from sodium persulfate and ammonium persulfate.

The temperature range of the crosslinking polymerization reaction is not particularly limited, but is in the range of about 50° C. to about 100° C. Considering the easiness of operation, the temperature is about 55° C. to about 90° C., preferably about 60 to 80° C. The optimal time for immersion in the crosslinking solution depends on the temperature, but usually it may be 48 hours or less, 24 hours or less, or 12 hours or less. For example, it may be performed for 0.5 to 5 hours, or 0.5 to 3 hours, specifically for 1 hour.

In a specific embodiment, the crosslinking solution for forming the crosslinked hydrogel can be prepared by dissolving an APS powder as an oxidation catalyst in a polymerization solvent at a concentration of 1 to 5 wt %, and dissolving BIS 30-50 mM. The surface on which the amide bond is formed in the above step can be immersed in a crosslinking solution at 60 to 80° C. for 1 to 3 hours to perform a crosslinking polymerization reaction.

The process of forming a hydrogel layer by performing multi-wet coating of the surface of a polymer substrate according to a specific embodiment of the present invention is shown in FIG. 1, and the super-hydrophilic surface treatment method for the polymer substrate filter according to the present embodiment will be described with reference to FIG. 1.

First, a thermosetting coating layer is formed on the surface of the polymer substrate filter (S10). The thermosetting coating layer may include polyimide (PI) or polyamic acid (PAA).

The thermosetting coating solution can be used as a coating solution by diluting a resin containing polyimide or polyamic acid alone or a mixture of the two materials with an organic solvent such as NMP (N-methyl-2-pyrrolidone), DMAC (dimethylacetamide), or DMF (dimethylformamide) at a weight ratio set in the range of 1 to 20 wt %. The filter is soaked in the prepared coating solution for 5 minutes to 1 hour, and taken out carefully. The solution is coated onto the surface, and then cured and dried at 110 to 130° C. for a set period of time in the range of 20 minutes to 1 hour, so that the thermosetting coating layer can be uniformly formed on the surface.

Next, a carboxylate group (—COO—) is formed on the surface of the thermosetting coating layer (S20). That is, the thermosetting coating layer is dissolved to form a carboxylic acid group (—COOH), which can be then reacted with N,N-dicyclohexylcarbodiimide (DCC) to form a carboxylate group (—COO—).

In order to induce a strong bond between the thermosetting coating layer and the hydrogel layer, the surface coated with thermosetting polymer is immersed in a DCC solution at room temperature for 5 to 30 minutes to form a carboxylate group. The DCC solution can be prepared by dissolving a DCC crystal powder in an organic solvent such as NMP at a weight ratio set in the range of 0.5 to 5 wt %.

Next, an amide bond is formed between the thermosetting coating layer and the hydrogel monomers (S30). At this time, acrylamide (Am) monomers can be reacted with the carboxylate group (—COO—) to form an amide bond. In order to form an amide bond, the filter on which the thermosetting coating layer is formed is immersed in a DCC solution at 25° C. for 10 minutes. The DCC solution is prepared by diluting N,N-dicyclohexylcarbodiimide (DCC) crystalline powder in NMP at a weight ratio of 0.5%.

The carboxylate group reacts with acrylamide to form an amide bond (—CONH—), which is a strong chemical bond. The surface having carboxylate groups formed on the surface by coating up to the second step is immersed in an Am solution (solution prepared by adding Am powder at a weight ratio of 20% to a solvent having a ratio of water and ethanol of 3:1) at 65° C. for 60 minutes to form an amide bond.

Next, the hydrogel monomers are crosslinked to form a hydrophilic polymer layer (S40). At this time, acrylamide (Am) chains can be crosslinked using bisacrylamide (BIS) and ammonium persulfate (APS) to form a hydrophilic polymer layer, which is a polyacrylamide (PAM) hydrogel layer.

Acrylamide (Am) chains can be crosslinked with BIS and formed into a PAM hydrogel layer to realize a super-hydrophilic surface. The crosslinking solution can be prepared by using water as a solvent, dissolving APS powder at a weight ratio of 1 to 5 wt %, and dissolving BIS 30 to 50 mM.

An embodiment of the present invention relates to a filter for oil-water separation comprising a polymer substrate fiber, and a thermosetting coating layer and a hydrogel layer formed on the surface of the fiber. More specifically, the present invention relates to a filter medium comprising a polymer fiber to be used for manufacturing a filtration filter, or a thermosetting coating layer and a hydrogel layer formed on the surface of the polymer fiber included in the filtration filter, or a filtration filter for oil-water separation, for example, a depth filtration filter, comprising the filter medium, wherein the thermosetting coating layer and the hydrogel layer are bonded by an acrylamide crosslink bond.

The filtration filter for oil-water separation may have a super-hydrophilicity with a contact angle to water in the air of 10° or less, and/or an oleophobicity with a contact angle to oil in water of 150° to 180°, more preferably 150° to 170°.

The filter for oil-water separation according to the present invention is a super-hydrophilic filter that is completely wetted with water with a contact angle with water of 10° or less. The filter gets completely wet with water and forms a water film, so the adhesive force with oil is very low. Therefore, water in the oil-water mixture passes through and oil is cut off by the water film, so that oil-water separation can be performed. This super-hydrophilic filter has almost no contamination by oil, and so can be usefully used as a filter for oil-water separation.

Advantageous Effects

According to the super-hydrophilic surface treatment method according to the embodiment of the present invention, a strong chemical bond between the surface of the polymer substrate and the hydrogel layer can be induced through multi-wet coating, thereby realizing a super-hydrophilic surface layer with excellent durability. Utilizing this, a highly efficient super-hydrophilic filter can be manufactured. Further, the coating solution used for the multi-wet coating can penetrate into the filter having a multi-layer structure, thereby fabricating a super-hydrophilic filter with a multi-layer structure.

Meanwhile, among the coating solutions used for the multi-wet coating, the remaining coating solutions excluding the mixture of APS and BIS can be reused, and since only the soaking method is used, there is an advantage in that the coating process is relatively simple.

Thereby, there is the advantage in that fabrication of a large-sized filter and fabrication of a mass-produced filter is facilitated. As a result, there is an advantage in that the super-hydrophilic surface treatment method according to the present embodiment can be usefully applied to the actual oil-water separation industry.

BRIEF DESCRIPTION OF THE DRAWINGS

FIG. 1 is a diagram sequentially showing the process of forming a hydrogel layer by multi-wet coating the surface of a filtration filter composed of polymer fibers;

FIG. 2 is an SEM image showing the pores formed by the intersection of polymer fibers and polymer fibers, with respect to the super-hydrophilic surface-treated polymer fiber and the untreated polymer fiber according to an embodiment of the present invention;

FIG. 3 is a graph showing the formation and contact angle of chemical groups according to the multi-wet coating process of the super-hydrophilic surface treatment method of a filtration filter composed of polymer fibers according to an embodiment of the present invention, wherein FIG. 3(A) is a graph showing the formation of chemical groups according to a multi-wet coating process obtained by Fourier transform infrared spectroscopy, and FIG. 3(B) is a graph showing the water contact angle in the air and the oil contact angle in water:

FIG. 4 is a photograph showing the contact angle of water droplets before and after multi-wet coating of a polymer filter manufactured through a multi-wet coating process according to an embodiment of the present invention;

FIG. 5 shows a comparison of the adhesion force according to the presence or absence of a thermosetting polyimide layer coating in the method for treating a super-hydrophilic surface of a polymer fiber according to an embodiment of the present invention, wherein FIG. 5(A) is the case of lacking thermosetting coating layer, and FIG. 5(B) is the case of applying a thermosetting coating;

FIG. 6 is a graph showing the oil contact angle in water of the super-hydrophilic filter manufactured in accordance with the super-hydrophilic surface treatment method according to an embodiment of the present invention;

FIG. 7 is a photograph showing that the super-hydrophilic filter manufactured in accordance with the super-hydrophilic surface treatment method according to an embodiment of the present invention does not contain any oil in water;

FIG. 8 is a graph showing the contact angle of water and the oil contact angle in water after 100 days of immersion of the super-hydrophilic filter manufactured in accordance with the super-hydrophilic surface treatment method according to an embodiment of the present invention in an acidic~basic solution;

FIG. 9 is a photograph showing the self-cleaning capability in water of the super-hydrophilic filter manufactured according to an embodiment of the present invention;

FIG. 10 is a photograph showing separation of an oil-water mixture with a filter housing including a super-hydrophilic filter manufactured according to an embodiment of the present invention; and FIG. 11 is a photograph of before (i) and after (ii) performing oil-water separation with an untreated filter (A) and a super-hydrophilic filter (B) manufactured according to an embodiment of the present invention, and of (iii) water recovered through the filter.

DETAILED DESCRIPTION OF THE EMBODIMENTS

The present invention will be described in more detail with reference to the following illustrative examples, but the scope of the present invention is not intended to be limited to the examples.

Example 1. Preparation of Super-Hydrophilic Filter According to Multi-Wet Coating Process 1-1: Formation of Thermosetting Coating Layer (PI Coating)

A photograph of a depth filtration filter having a commercially available polypropylene multilayer structure without surface treatment for producing a coating (Comparative Example 1 on the left side) is shown in FIG. 2.

In order to form a thermosetting coating layer, a commercially available polypropylene multilayer structure filter was immersed in a polyimide solution at 25° C. for 30 minutes in a vacuum state. The polyimide solution was prepared by diluting polyimide resin (PI Varnish, DFPI-101; manufactured by Dongback Fine-Chem) in NMP (N-methyl-2-pyrrolidone) as an organic solvent to a concentration of 3%. The filter immersed in the polyimide solution was taken out, dried and cured at 110° C. for 30 minutes to form a thermosetting coating layer on the filter surface.

1-2: Formation of Carboxylate in Thermosetting Coating Layer (NMP/DCC Treatment)

In order to form an amide bond on the polypropylene fiber on which the thermosetting coating layer was formed, the polymer fiber on which the thermosetting coating layer was formed was immersed in a DCC solution in a vacuum at 25° C. for 10 minutes. The DCC solution is a solution prepared by diluting N,N-dicyclohexylcarbodiimide (DCC) in NMP at a weight ratio of 0.5%. In this process, the thermosetting coating layer was dissolved by NMP to form a carboxylic acid group (—COOH), and this carboxylic acid group was deprotonated by DCC to form a carboxylate group (—COO—).

1-3: Formation of Amide Bond in the Thermosetting Coating Layer

The surface of the polypropylene fiber having a carboxylate group formed on the surface obtained in Example 1-2 was immersed in an acrylamide (Am) solution in a vacuum at 65° C. for 60 minutes. The Am solution is a solution prepared by adding an Am monomer powder in a weight ratio of 20% to a solvent having a ratio of water to ethanol of 3:1. The amide bond was formed by nucleophilic reaction of the amine group (—NH$_2$) of Am with the carboxylate group.

1-4: Formation of Hydrophilic Hydrogel Layer

In order to form a hydrogel layer in which Am is crosslinked, the polypropylene fibers formed with amide bonds in the thermosetting coating layer were immersed in a crosslinking solution at 65° C. for 60 minutes in a vacuum state. The crosslinking solution was prepared by dissolving 30 mM of 1 wt % ammonium persulfate (APS) and N,N-methylenebisacrylamide (BIS) as an oxidizing agent using water as a solvent. By the above reaction, the acrylamide polymer was crosslinked with BIS and formed into a polyacrylamide (PAM) hydrogel layer, thereby capable of realizing a super-hydrophilic surface. A photograph (Example 1 on the right side) of a filter composed of polypropylene fibers on which the super-hydrophilic surface treatment has been completed is shown in FIG. 2.

Example 2. Characteristics Evaluation in the Process of Forming a Coating Layer of a Polymer Filter 2-1: Spectroscopic Analysis of the Filter For a filter composed of polypropylene fibers having a surface product obtained in the above process, the formation of functional groups was evaluated using Fourier transform infrared spectroscopy.

According to the evaluation result of the formation of functional groups using Fourier transform infrared spectroscopy obtained in FIG. 3(A) of FIG. 3, when polyimide was coated in the first step, characteristic peaks appeared at 1359 and 1712 cm$^{-1}$, which means a C—N bond and a C=O bond. After NMP/DCC treatment in the second step, characteristic peaks appeared at 1406, 1652, and 3415 cm$^{-1}$, which show a carboxylate group and a secondary amine group. After immersion in the Am solution in the third step, characteristic peaks showing the Am layer and the amide bond appeared at 1610, 1667, and 3338 cm$^{-1}$. In the fourth step, a PAM layer was formed by crosslinking with BIS, and a characteristic band was formed between 1600 and 1700 cm$^{-1}$.

2-2: Evaluation of Hydrophilicity and Lipophilicity of the Filter

The water contact angle in the air and the oil contact angle in water were measured, and the measurement results are shown in the graphs of FIG. 3, and the water contact angle in the air of the super-hydrophilic filter according to Example 1-4 and the untreated filter of Comparative Example 1 is shown in FIG. 4.

Specifically, the water contact angle in air was measured in air with 5 μL of de-ionized water at room temperature with SmartDrop, which is a contact angle measuring device manufactured by Femtofab. The oil contact angle in water was measured in water with 5 μL of diesel at room temperature with SmartDrop, which is a contact angle measuring device manufactured by Femtofab. The reason that the oil contact angle was measured in water is that the prepared filter is an underwater oleophobic filter, which proves that oil does not adhere in water.

According to the contact angle measurement result obtained in FIG. 3(B), in the case of untreated PP filter, due to the presence of micrometer-sized fibers and methyl groups with low surface tension, it has a relatively high hydrophobicity with a water contact angle of 132.2° and a lipophilicity with an oil contact angle of 0°.

In the first step of Example 1, due to the alkyl chain of the coating layer after polyimide coating, it exhibits hydrophobicity and lipophilicity with a water contact angle being 124.5°. After NMP/DCC treatment in the second step, it has hydrophobicity and lipophilicity with a water contact angle being 107.8°. Even after treatment with Am in the third step, it shows hydrophobicity and lipophilicity with a water contact angle being 123°.

Am is well known as a hydrophilic material, but is bonded with a hydrophilic amine group and a carboxylate group formed on the surface after NMP/DCC treatment to form an amide group, and the hydrophobic alkyl chain is exposed on the surface. Therefore, after Am coating, the surface exhibits a hydrophobicity. When these chains are crosslinked with BIS in the fourth step to form a PAM hydrogel layer, it shows a super-hydrophilicity with a water contact angle of 0° and a super-oleophobicity with oil contact angle of 154.3°.

Comparative Example 2: Preparation of a Filter that does not Form a Thermosetting Coating Layer The filter made of untreated polypropylene fiber in Example 1 was not subjected to the thermosetting coating layer forming step (PI coating) according to Example 1-1 and the carboxylate group forming step through NMP/DCC coating according to Example 1-2, but subjected to the processes of Examples 1-3 and 1-4 to prepare a surface treatment filter.

Specifically, the untreated heater of Example 1 was immersed in Am solution at 65° C. for 60 minutes. The Am solution is a solution prepared by adding Am monomer powder in a weight ratio of 20% to a solvent having a ratio of water and ethanol of 3:1. The treated filter was immersed in the crosslinking solution at 65° C. for 60 minutes. The crosslinking solution was prepared by using water as a solvent, and dissolving 30 mM of 1 wt % ammonium persulfate (APS) and N,N-methylenebisacrylamide (BIS).

Example 3. Evaluation of the Adhesion Force of the Hydrogel of the Filter

The adhesion force of the super-hydrophilic hydrogel layer according to the presence or absence of the thermosetting polyimide layer coating in the method for treating the ultra-hydrophilic surface of the polymer substrate according to this example was compared.

For the super-hydrophilic polymer filter prepared in Example 1-4, the tape adhesion properties were tested by a process in which a commercially available Scotch tape (3M) was adhered to the prepared surface, rubbed for 5 seconds and then detached. The water contact angle in the air of the filter before and after adhering the tape was measured in substantially the same manner as in Example 2. The results are shown in FIG. 5(B).

For the polymer filter surface-treated according to Comparative Example 2, the tape adhesion properties were tested in the same manner as above, and the water contact angle in the air of the filter before and after adhering the tape was measured in substantially the same manner as in Example 2. The results are shown in FIG. 5(A).

Referring to FIG. 5(A), as a result of the tape adhesion test, in the absence of the thermosetting coating layer according to Comparative Example 2, the contact angle measured before tape adhesion shows 18.9°, but the contact angle measured after tape adhesion shows 84.6°, which showed that the hydrogel layer easily loses its hydrophilicity away from the polymer surface. In the case of FIG. 5 (A), when only steps 1-3 and 1-4 were performed without performing steps 1-1 and 1-2 in Example 1, there are no formation of a thermosetting coating layer and no formation of a carboxylate group by NMP/DCC coating, and no amide bond occurs, which shows that the hydrophilic hydrogel layer does not bind strongly to the polymer substrate surface.

On the other hand, referring to FIG. 5 (B), when the thermosetting coating is applied according to Example 1, the hydrogel layer is firmly attached to the polymer surface by forming an amide bond, which shows that hydrophilicity is not lost. In the case of FIG. 5 (B), as an amide bond is formed through all the steps of Example 1 and the hydrogel layer and the polymer substrate are strongly bonded, which demonstrates that the adhesion force of the hydrogel is improved through the PI coating and NMP/DCC treatment of Example 1.

Example 4. Evaluation of Oil Oleophobicity of Filters 4-1: Evaluation of Oleophobicity in Various Oils The oil contact angle in water of the super-hydrophilic filter prepared according to Example 1 was measured for diesel, gasoline, hexane, toluene, and crude oil in substantially the same manner as the measurement of the oil contact angle in water of Example 2, and the results are shown in FIG. 6.

From the graph of FIG. 6, it was confirmed that the super-hydrophilic filter exhibits super-oleophobicity in water for various oils. Specifically, the contact angle with the filter in water is 154.3° for diesel, 155.1° for gasoline, 157° for hexane, 158.6° for toluene, and 157.2° for crude oil, and the filter shows super-oleophobicity in water against various types of oils.

4-2: Evaluation of Oleophobicity

An experiment was performed to inject oils (diesel, dyed in red) into the super-hydrophilic filter in Example 1 in water, and the results are shown in FIG. 7. Referring to FIG. 7, it shows that the super-hydrophilic filter does not contain any oil in water.

Example 5. Evaluation of Chemical Resistance of the Filter

After the super-hydrophilic filter according to Example 1 was immersed in a pH standard solution of pH 3, pH 5, pH 7, pH 9 or pH 11 (Samchun Chemical, Korea) for 100 days, the water contact angle in the air and the oil contact angle in water were measured in the same manner as in Example 2. The results are shown in FIG. 8.

From the experimental results of FIG. 8, it was confirmed that even after the super-hydrophilic surface treatment filter was immersed and stored under various pH conditions, the super-hydrophilicity of the filter and the super-oleophobicity in water are excellently preserved. This shows that the hydrogel layer is firmly adhered to the polymer substrate, and there is no dissolution or damage to the hydrophilic layer even in acidic and basic solutions, so that the super-hydrophilicity is maintained without deterioration of the surface properties. Therefore, it was found that the super-hydrophilic filter according to the present invention has chemical resistance.

Example 6. Evaluation of Self-Cleaning Capability of Filters 6-1: Oil Immersion after Water Immersion An experiment was performed to confirm the self-cleaning capability of the super-hydrophilic filter manufactured according to the present embodiment in water.

Specifically, this is to evaluate the self-cleaning capability of the oil adhering to the super-hydrophilic surface of the super-hydrophilic filter prepared in Example 1. The super-hydrophilic filter was soaked in water for 10 seconds in advance, wetted with water, and then immersed in oil (diesel, dyed in red) for 5 seconds. Then, the super-hydrophilic filter was again soaked in water for 1 minute, and the filter was shaken for an additional 20 seconds to remove the oil adhering to the surface. The filter was taken out, and the oil remaining on the surface was confirmed. The results are shown in FIG. 9. In FIG. 9 (A), the self-cleaning experiment was performed by immersing the untreated polypropylene filter of Comparative Example 1 in water for 5 seconds in advance and then immersing it in oil, and in FIG. 9 (B), the self-cleaning experiment was performed by immersing the surface-treated filter according to Example 1 in water in advance and then immersing it in oil for 5 seconds.

As shown in FIGS. 9 (A) and (B), when red remains on the surface, it shows that the oil is adsorbed on the filter and is not self-cleaned. If the super-hydrophilic surface is wetted with water in advance, it can be confirmed that a water film is formed, and the oil does not adhere well even when immersed in oil, and when immersed in water again, the oil is detached and has self-cleaning capability.

When the filter gets wet with water before adhering to oil, the oil does not adhere well to the super-hydrophilic filter, and thus, the filter is immersed in water, some remaining oil is completely detached and the filter has a self-cleaning capability.

6-2: Oil Immersion without Water Soaking

The super-hydrophilic filter prepared in Example 1 and the untreated filter of Comparative Example 1 were not wetted with water in advance, and immersed in oil for 5 seconds, thereby allowing the oil to adsorb to the filter. Then, it was immersed in water for 1 minute and shaken for 20 seconds to confirm whether the oil was desorbed or not. The results are shown in FIG. 9. In FIG. 9(C), the untreated polypropylene filter of Comparative Example 1 was immersed in oil for 5 seconds without immersing it in water in advance, and a self-cleaning experiment was performed. In FIG. 9 (D), the filter surface-treated according to Example 1 was not immersed in water in advance, but immersed in oil for 5 seconds, and a self-cleaning experiment was performed.

As shown in FIGS. 9 (C) and (D), when the prepared super-hydrophilic filter was not soaked in water in advance, no water film was formed on the surface, and oil was easily adsorbed. However, when the oil-adsorbed super-hydrophilic surface was immersed in water, a mutual attraction between the surface and water was stronger than a mutual attraction between the surface and the oil, so the water repels the oil attached to the surface. As a result, the oil was agglomerated and desorbed slowly.

According to FIG. 9 (E), when it is not immersed in water in advance, it gets wet easily with oil ((E)i) even if it is a super-hydrophilic filter. When the oil-soaked filter is immersed in water, the mutual attraction between the filter and water is much greater than the attraction between the filter and oil ((E)ii), and thus, the filter is gradually wetted with water ((E)iii), and the oil is gradually desorbed ((E)iv) accordingly. A super-hydrophilic filter contaminated with oil was self-cleaned in water.

Example 7. Performing Oil-Water Separation Using a Filter

The super-hydrophilic filter surface-treated according to Example 1 was placed inside the filter housing, and a mixture of water and oil (diesel, dyed in red) (water:oil=4:1 volume ratio) was flown into the inlet side, and the fluid after passing through the filter was analyzed. An exemplary view of the filter and filter housing is shown in FIG. 10.

In relation to the treatment of a mixture of water and oil using the super-hydrophilic filter, the state of the filter before (i) and after (ii) performing the oil-water separation, and the state of the water (iii) recovered through the filter are shown in FIG. 11 (B).

Oil-water separation using the super-hydrophilic filter of Example 1 was performed similarly by using the polypropylene filter (or untreated filter) of Comparative Example 1, and the result is shown as a Comparative Example in FIG. 11(A).

As shown in the experimental results of FIG. 11, the untreated filter that has not been subjected to surface treatment is easily contaminated by oil when applied to oil-water separation, and oil-water separation is not performed. On the other hand, the super-hydrophilic filter of Example 1 is not contaminated by oil, and can selectively recover only water from a mixture of water and oil.

The invention claimed is:

1. A filter for oil-water separation comprising a polymer fiber substrate, and a thermosetting coating layer and a hydrogel layer formed on the surface of the polymer fiber substrate,
    wherein the thermosetting coating layer and the hydrogel layer are bonded by forming acrylamide crosslink bond, and
    wherein the filter has a super-hydrophilicity with a contact angle to water in the air being 10° or less.

2. The filter for oil-water separation according to claim 1, wherein the filter has a contact angle to oil in water of 150° to 180°.

3. The filter for oil-water separation according to claim 1, wherein the filter selectively separates only water in the oil-water mixture.

4. The filter for oil-water separation according to claim 1, wherein the thermosetting coating layer is formed of a coating solution containing polyimide (PI) or polyamic acid (PAA).

5. The filter for oil-water separation according to claim 1, wherein the polymer substrate comprises at least one selected from the group consisting of polypropylene (PP), polyethylene (PE), polyvinylidene fluoride (PVDF) and polytetrafluoroethylene (PTFE).

6. The filter for oil-water separation according to claim 4, wherein the polyimide (PI) is an aromatic heterocyclic compound.

* * * * *